US012085268B2

(12) United States Patent
Chen et al.

(10) Patent No.: US 12,085,268 B2
(45) Date of Patent: Sep. 10, 2024

(54) HEAT SINK, SEPARATOR, AND LIGHTING DEVICE APPLYING SAME

(71) Applicants: Shanghai Sansi Electronic Engineering Co. Ltd., Shanghai (CN); Shanghai Sansi Technology Co. Ltd., Shanghai (CN); Jiashan Sansi Optoelectronic Technology Co. Ltd., Jiaxing (CN); Pujiang Sansi Optoelectronic Technology Co. Ltd., Jinhua (CN)

(72) Inventors: Bishou Chen, Shanghai (CN); Ming Chen, Shanghai (CN); Shan Li, Shanghai (CN); Qi Li, Shanghai (CN); Lili Zhao, Shanghai (CN)

(73) Assignees: Shanghai Sansi Electronic Engineering Co. Ltd., Shanghai (CN); Shanghai Sansi Technology Co. Ltd., Shanghai (CN); Jiashan Sansi Optoelectronic Technology Co. Ltd., Zhejiang (CN); Pujiang Sansi Optoelectronic Technology Co. Ltd., Zhejiang (CN)

( * ) Notice: Subject to any disclaimer, the term of this patent is extended or adjusted under 35 U.S.C. 154(b) by 0 days.

(21) Appl. No.: 18/385,364

(22) Filed: Oct. 30, 2023

(65) Prior Publication Data

US 2024/0142098 A1 May 2, 2024

(30) Foreign Application Priority Data

Nov. 1, 2022 (CN) ......................... 202211357895.5
Nov. 1, 2022 (CN) ......................... 202222898917.0

(51) Int. Cl.
*F21V 29/75* (2015.01)
*F21Y 113/00* (2016.01)

(52) U.S. Cl.
CPC ........... *F21V 29/75* (2015.01); *F21Y 2113/00* (2013.01)

(58) Field of Classification Search
CPC ............................. F21V 29/74; H01L 23/3672
See application file for complete search history.

(56) References Cited

U.S. PATENT DOCUMENTS

2009/0080205 A1* 3/2009 Chang ..................... F21K 9/232 362/373
2009/0116233 A1* 5/2009 Zheng ..................... F21K 9/232 362/234

(Continued)

*Primary Examiner* — Andrew J Coughlin
(74) *Attorney, Agent, or Firm* — IPRTOP LLC

(57) ABSTRACT

A heat sink, a separator, and a lighting device applying the same are provided. The heat sink comprises: a housing, formed around an axis, wherein the housing has a first open end and a second open end along the axis, and a holding cavity connecting the two open ends. The housing comprises a first portion and a second portion, both formed around the axis, wherein the first portion comprises several device mounting portions distributed around the axis. The second portion comprises an outer fin set disposed around the axis in an outer peripheral region, and an inner fin set disposed around the axis in an inner peripheral region; the first portion is closer to the first open end than the second portion is to the first open end, and the outer fin set extends toward the second open end; each fin extends toward the axis.

20 Claims, 11 Drawing Sheets

(56) References Cited

U.S. PATENT DOCUMENTS

| | | | | |
|---|---|---|---|---|
| 2010/0214781 A1* | 8/2010 | Chiu | F21K 9/232 | 362/373 |
| 2010/0314985 A1* | 12/2010 | Premysler | G02B 19/0061 | 313/46 |
| 2012/0112615 A1* | 5/2012 | Kuenzler | F21K 9/232 | 313/46 |
| 2014/0340899 A1* | 11/2014 | Bailey | F21V 29/83 | 362/249.02 |
| 2015/0233571 A1* | 8/2015 | Inan | F21K 9/232 | 362/84 |
| 2016/0123571 A1* | 5/2016 | Chan | F21V 29/83 | 362/249.01 |
| 2016/0223182 A1* | 8/2016 | Jiang | F21V 29/77 | |
| 2018/0299114 A1* | 10/2018 | Inan | F21V 29/77 | |
| 2019/0242569 A1* | 8/2019 | Jiang | F21K 9/237 | |
| 2023/0007892 A1* | 1/2023 | Chen | F21V 29/83 | |
| 2024/0068643 A1* | 2/2024 | Ray | F21V 21/30 | |
| 2024/0142098 A1* | 5/2024 | Chen | F21V 29/75 | |

* cited by examiner

HEAT SINK, SEPARATOR, AND LIGHTING DEVICE APPLYING SAME

CROSS REFERENCE TO RELATED APPLICATION

The present application claims the benefit of priority to Chinese Patent Application No. CN 202211357895.5, and Chinese Patent Application No. CN 202222898917.0, both entitled "HEAT SINK, SEPARATOR, AND LIGHTING DEVICE APPLYING SAME", filed with CNIPA on Nov. 1, 2022, the disclosure of which is incorporated herein by reference in its entirety for all purposes.

FIELD OF THE INVENTION

The present disclosure generally relates to lighting equipment, and in particular to a heat sink, a separator, and a lighting device applying the heat sink and the separator.

BACKGROUND OF THE INVENTION

Current light bulbs usually use the "chimney effect" to achieve heat dissipation. Specifically, a heat dissipation channel is formed in the bulb and extends along an axis of the bulb, for ventilation. For example, in U.S. Pat. No. 8,939,608B1, heat dissipation is mainly achieved by a vertical channel throughout the bulb. Since hot air rises, air will flow into the channel from the bottom and out of the channel from the top, carrying heat out of the bulb.

However, the heat dissipation effect of the above method is limited by the flow rate of the air, and the heat dissipation area is relatively small, which further limits the heat dissipation effect. More importantly, the light bulb in the above example can only be placed vertically when used, and if it is placed horizontally, air will be unable to flow through the channel, which is likely to cause light source chips in the light bulb to burn up due to heat accumulation.

SUMMARY OF THE INVENTION

A first aspect of the present disclosure provides a heat sink including: a housing, symmetrical with respect to an axis, wherein the housing has a first open end and a second open end along the axis, and a holding cavity connecting the first open end and the second open end; wherein the housing includes a first portion and a second portion, both symmetrically formed around the axis, wherein the first portion includes a plurality of device mounting portions symmetrically disposed around the axis; wherein the second portion includes fin structures; wherein the fin structures include an outer fin set disposed around the axis in an outer peripheral region, and an inner fin set disposed around the axis in an inner peripheral region adjacent to the outer peripheral region; wherein the first portion is closer to the first open end than the second portion is to the first open end, and the outer fin set extends toward the second open end; wherein outer fins of the outer fin set and inner fins of the inner fin set extend toward the axis that passes through the holding cavity, and the inner fins extend deeper into the holding cavity than the outer fins, so as to partially block airflow parallel to the axis.

In an embodiment of the first aspect, the outer fin set includes one or more first outer fins and one or more second outer fins, and the first outer fins and the second outer fins have different heights, wherein a height of the first outer fins or the second outer fins is a length of the first outer fins or the second outer fins measured from a connection point between the first outer fins or the second outer fins and the housing along a direction parallel to the axis and towards the second open end.

In an embodiment of the first aspect, the outer fin set includes a plurality of first outer fins having a first height, and a plurality of second outer fins having a second height, with the first height being greater than the second height.

In an embodiment of the first aspect, the one or more first outer fins and the one or more second outer fins are alternately disposed around the axis.

In an embodiment of the first aspect, the first height is between 20 mm and 32 mm, or between 32 mm and 40 mm. and/or, the second height is between 10 mm and 20 mm, or between 20 mm and 30 mm.

In an embodiment of the first aspect, a thickness of a top portion of each first outer fin is between 20 mm and 32 mm, or between 32 mm and 40 mm; a thickness of a bottom portion of each first outer fin is between 1 mm and 2.3 mm, or between 2.3 mm and 4 mm; and/or a thickness of a top portion of each second outer fin is between 0.8 mm and 1.4 mm, or between 1.4 mm and 2 mm; a thickness of a bottom portion of each second outer fin is between 0.8 mm and 2.3 mm, or between 2.3 mm and 4 mm; wherein the top portions refer to portions of the plurality of first outer fins and the plurality of second outer fins closer to the second open end, and the bottom portions refer to portions of the plurality of first outer fins and the plurality of second outer fins closer to the first open end.

In an embodiment of the first aspect, the plurality of first outer fins extend towards the axis with a first extension length of 5 mm to 17 mm, or 17 mm to 25 mm; and/or, the plurality of second outer fins extend towards the axis with a second extension length of 5 mm to 8.5 mm, or 8.5 mm to 25 mm.

In an embodiment of the first aspect, the plurality of second outer fins includes 6 to 18 fins, or 18 to 24 fins; and/or, the plurality of second outer fins includes 6 to 15 fins, or 15 to 21 fins.

In an embodiment of the first aspect, a thickness of top portions of each inner fin is between 0.8 mm and 1.4 mm, or between 1.4 mm and 2 mm; a thickness of bottom portions of each inner fin is between 1 mm and 3 mm, or between 3 mm and 4.5 mm.

In an embodiment of the first aspect, each fin of the outer fin set and/or the inner fin set has a thickness gradually changing along a direction pointing from its top portion to its bottom portion, or, the top portion of each fin of the outer fin set and/or the inner fin has a thickness different than that of the bottom portion of the same fin.

In an embodiment of the first aspect, each fin of the inner fin set is connected to one or more fins of the outer fin set.

In an embodiment of the first aspect, the outer fin set includes: a plurality of first outer fins having a first height and a plurality of second outer fins having a second height, the first height being greater than the second height; the inner fin set is connected to the plurality of second outer fins.

In an embodiment of the first aspect, fins of the outer fin set are evenly distributed around the axis and/or, fins of the inner fin set are evenly distributed around the axis.

In an embodiment of the first aspect, the inner fin set extends into the housing with a third extension length of 5 mm to 16 mm, or 16 mm to 20 mm.

In an embodiment of the first aspect, the inner fin set includes 6 to 12 fins, or 12 to 24 fins.

In an embodiment of the first aspect, the heat sink is flat at the first open end with no notches.

A second aspect of the present disclosure provides a separator used in the holding cavity of the heat sink as in the first aspect, wherein the separator includes: a separating part, placed in the holding cavity and abutting an inner wall of the heat sink; wherein the separating part has a contour in a shape of a frustum, the frustum has a top surface facing towards the second open end, and a bottom surface opposite to the top surface and larger than the top surface, and the top surface of the frustum is surrounded by the inner fin set, wherein a plurality of first hollow sections is provided on a side surface of the separating part, and the side surface of the separating part is between the top surface and bottom surface of the frustum; a plurality of wiring pillars formed upon the separating part; each of the plurality of wiring pillars is formed between two adjacent fins of the inner fin set; each of the plurality of wiring pillars includes a wiring cavity, wherein the wiring cavity has two distal openings at two ends of the corresponding wiring pillar; a first end of each of the plurality of wiring pillars is connected to the separating part, the corresponding opening at the first end is communicated with a power supply cavity, and a second end of each of the plurality of wiring pillars extends towards the second open end and has a pointed cone shape.

In an embodiment of the second aspect, a plurality of strips is formed on the side surface of the separating part and distributed in a radiating manner around the axis, each of the plurality of strips connects the top surface of the frustum to the bottom surface of the frustum, and at least one of the plurality of first hollow sections is formed between each two adjacent strips of the plurality of strips; and/or, at least one second hollow section is provided on a side surface of each of the plurality of wiring pillars.

A third aspect of the present disclosure provides a lighting device including a plurality of light source components; a heat sink as described in any embodiment of the first aspect, wherein each of the device mounting portions is provided with one or more of the plurality of light source components; a separator as described in any embodiment of the second aspect, assembled with the heat sink; a power supply cover, which has a first end snap-fittedly connected to the second portion of the housing of the heat sink, wherein a power supply cavity is formed between the power supply cover and the separator, for accommodating a power supply component; wherein the power supply cover has a second end connected to a lamp holder; wherein a plurality of ventilation sections are formed on a surface of the power supply cover.

In an embodiment of the third aspect, the light source components include a heat dissipation patch, attached to one of the device mounting portions; one or more light source devices, attached to a surface of the heat dissipation patch facing away from the corresponding device mounting portion; and a light-guiding cover, configured to cover the light source devices.

In summary, a heat sink, a separator, and a lighting device applying the same are provided. The heat sink includes: a housing, symmetrical with respect to an axis, wherein the housing has a first open end and a second open end along the axis, and a holding cavity connecting the first open end and the second open end; the housing includes a first portion and a second portion disposed along the axis, the first portion including a plurality of device mounting portions disposed around the axis; the second portion includes fin structures, wherein the fin structures include an outer fin set disposed around the axis in an outer peripheral region, and an inner fin set disposed around the axis in an inner peripheral region; the first portion is closer to the first open end than the second portion is to the first open end, and the outer fin set extends toward the second open end; each fin extends toward the axis that passes through the holding cavity, so as to partially block airflow parallel to the axis. Thus, by combining the inner and outer fins to replace vertical heat dissipation channels used in conventional lamps, the lighting device of the present disclosure can have good heat dissipation no matter how it is orientated.

DETAILED DESCRIPTION

Figure 1:
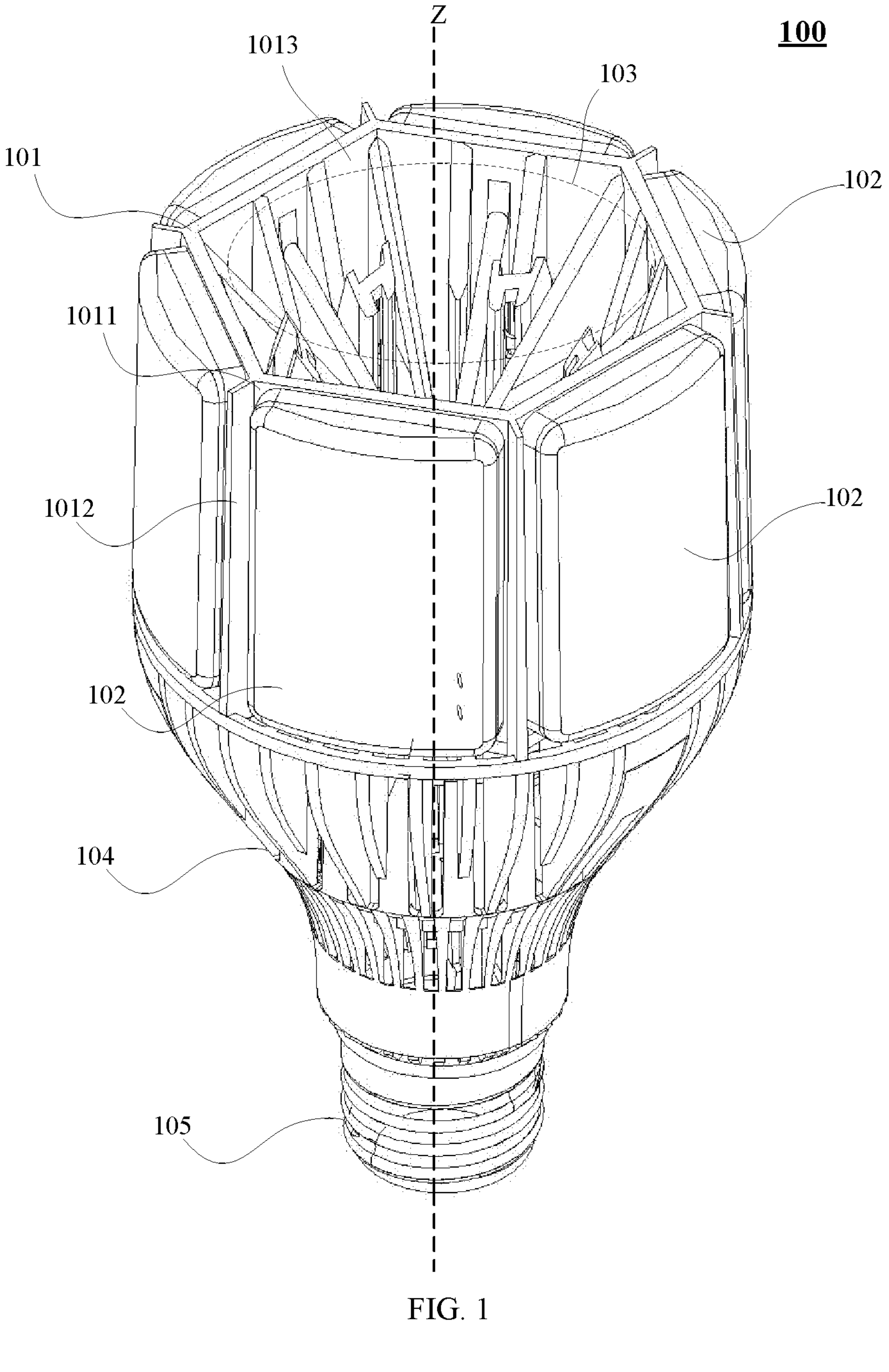
FIG. 1 shows a schematic structural diagram of an assembled lighting device according to an embodiment of the present disclosure.

The following describes the implementation of the present disclosure through specific examples, and those skilled in the art can easily understand other advantages and effects of the present disclosure from the content disclosed in this specification. The present disclosure can also be implemented or applied through other different specific embodiments. Various details in this specification can also be modified or changed based on different viewpoints and applications without departing from the spirit of the present disclosure. It should be noted that the following embodiments and the features in the embodiments can be combined with each other if no conflict will result.

The following detailed description is provided for embodiments of the present disclosure with reference to the accompanying drawings so that they can be easily implemented by a person skilled in the art to which the present disclosure belongs. The present disclosure can be embodied in a variety of different forms and is not limited to the embodiments described herein.

In the present disclosure, terms like “an embodiment,” “one embodiment,” “an example,” “specific example”, or “some examples” mean that the specific features, structures, materials, or characteristics represented in conjunction with the embodiment or example are included in at least one embodiment or example of the present disclosure. Further, the specific features, structures, materials, or characteristics represented may be combined in a suitable manner in any embodiments or examples. It should be noted that the following embodiments and examples, and features thereof can be combined with each other by a person skilled in the art if no conflict will result.

In addition, the terms like "first" and "second" are used for indication purpose only, and are not to be construed as indicating or implying relative importance or implicitly specifying numbers of technical features indicated. Thus, features qualified with terms like "first" and "second" may explicitly or implicitly include at least one such feature. In the present disclosure, "group" and/or "set" means two or more, unless otherwise expressly specified.

For clarity of the present disclosure, elements not highly relevant to the invention may be omitted, and the same reference symbols are given to the same or similar elements throughout the specification.

Throughout the specification, when a first element is "connected" to a second element, the first element may be in a "direct connection" with the second element, or the first element may be in an "indirect connection" with the second element with another element between the two. In addition, when a certain component "includes" a certain element, unless otherwise stated, other elements are not excluded, which means other elements may be included.

Although in some examples the terms "first" and "second", etc. are used herein to denote various elements, these elements are limited by these terms. These terms are used only to distinguish one element from another. These terms are only used to distinguish one element from another. For example, first interface and second interface are two interfaces that are not necessarily ordered. As used herein, the singular forms "a", "an" and "said/the" are intended to include the plural forms, unless the context clearly points out differently. It should be further understood that the terms "include" and "comprise" indicate the existence of the described features, steps, operations, elements, components, items, categories, and/or groups, but do not exclude the existence, presence, or addition of one or group of other features, steps, operations, elements, components, items, categories, and/or groups. As used herein, the terms "or" and "and/or" are inclusive, and are used to include any of the associated listed items and all combinations thereof. Thus, "A, B or C" or "A, B and/or C" means "any of the following: B; C; A and B; A and C; B and C; A, B and C". Exceptions to this definition apply only when combinations of elements, functions, steps, or operations are inherently paradoxical in some way.

The terminology herein is used in an exemplary manner, and is not intended to limit the present disclosure. The singular form as used herein includes plural forms as long as the statement does not explicitly indicate the opposite. The word "include" used in the specification means the materialization of the specific features, regions, integers, steps, operations, elements and/or components, and does not exclude the existence or addition of other features, regions, integers, steps, operations, elements and/or components.

Although not defined differently, all terms, including technical terms and scientific terms used herein, have the same meaning as generally understood by those skilled in the art to which this disclosure belongs. Terms defined in commonly used dictionaries are additionally interpreted as having meanings consistent with the contents of the present disclosure, and they should not be interpreted in an ideal or overly formulaic way unless so defined.

In some existing light bulbs, an open heat dissipation channel is formed at the top of the bulb and parallel to the axis of the bulb, to dissipate heat. By setting the bulb upright, the heat generated by the bulb can be discharged through upward airflow based on the "chimney effect", i.e., hot air rises, to achieve heat dissipation. However, such a structure will limit how the bulb should be orientated when used. The bulb can only be vertically placed, and once tilted or placed horizontal, the heat dissipation channel will no longer function, which will in turn cause overheating, even destruction, of the bulb.

In view of this, the present disclosure introduces fin structures to block airflow to achieve fast heat dissipation, and does not use vertical heat dissipation channels, so that the lighting device can be placed at various angles when used.

Figure 2:
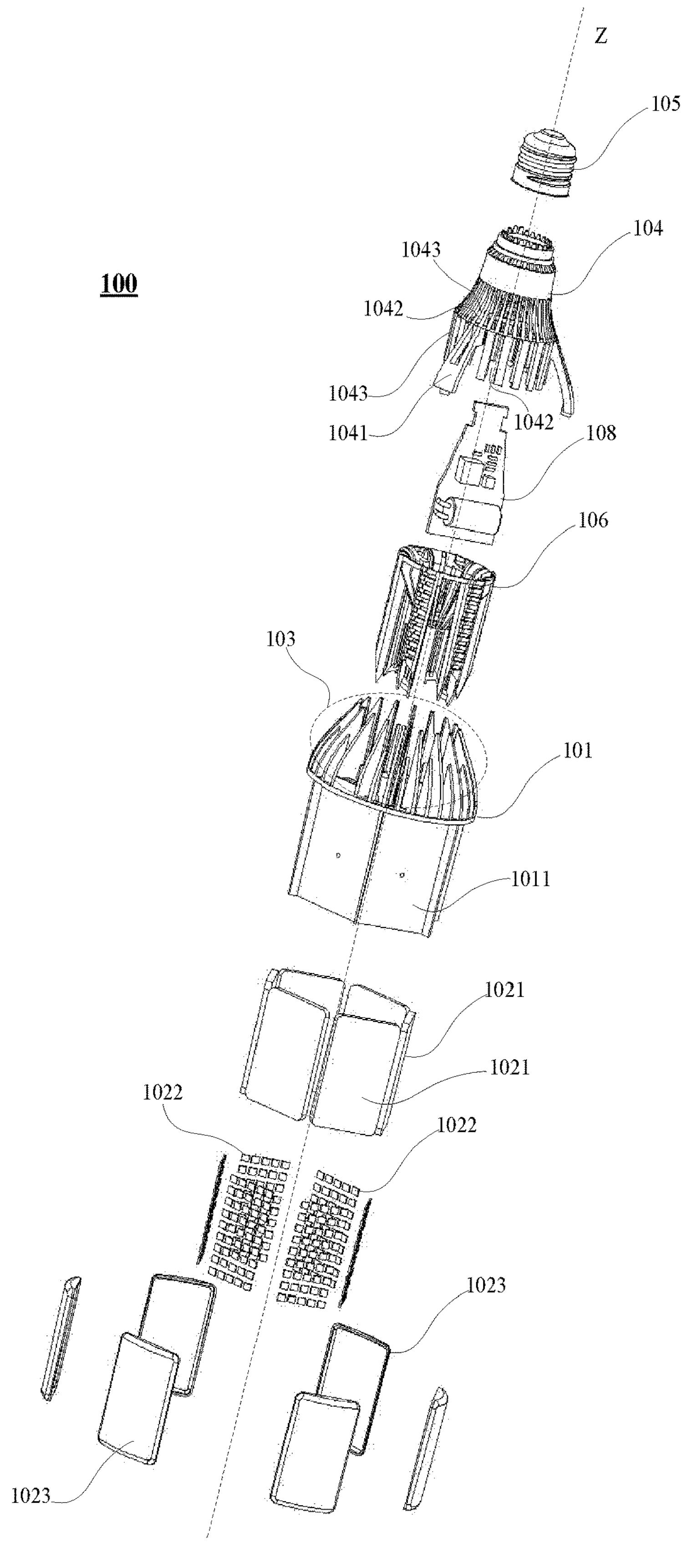
FIG. 2 shows an exploded view of the lighting device in FIG. 1.
Figure 3:
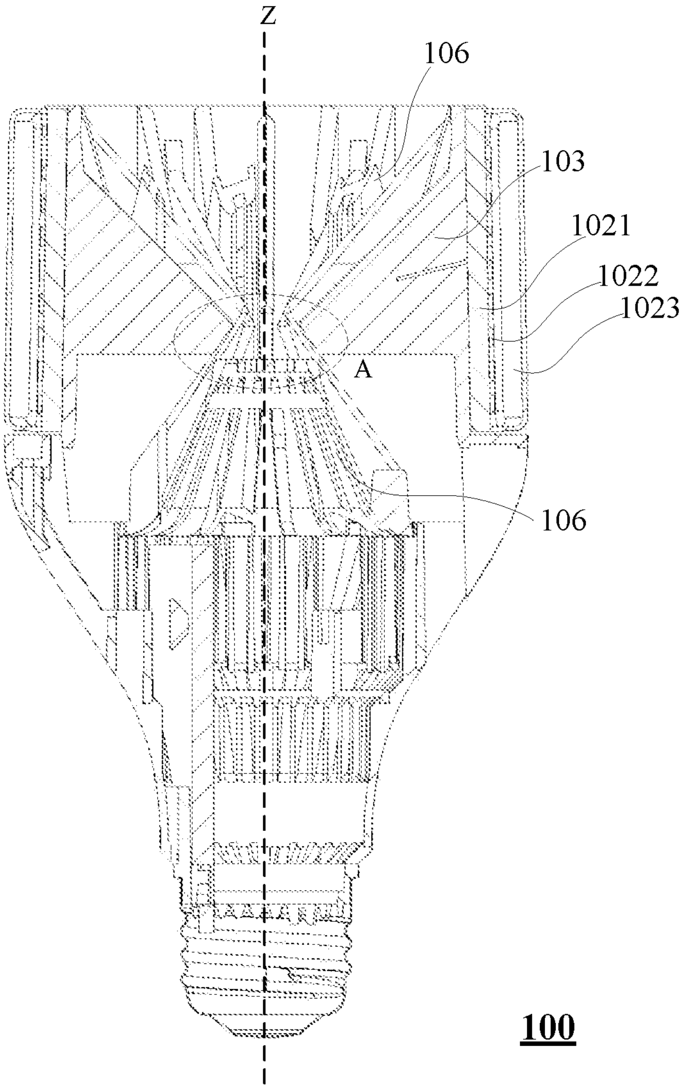
FIG. 3 shows a vertical cross-section of the lighting device in FIG. 1.

Please refer to FIG. 1, FIG. 2 and FIG. 3. FIG. 1 shows a schematic structural diagram of an assembled lighting device according to an embodiment of the present disclosure. FIG. 2 shows an upside-down exploded view of the lighting device in FIG. 1. FIG. 3 shows a vertical cross-section of the lighting device in FIG. 1.

In FIG. 1, the overall shape of the lighting device 100 is shown. The lighting device 100 is exemplarily shown as a light bulb in FIG. 1. The axis Z of the lighting device 100 will be used hereinafter for more detailed structural description of the light device 100 and related components. The lighting device 100 includes a heat sink 101, the heat sink 101 has a plurality of device mounting portions 1011 disposed around the axis Z, and each device mounting portion 1011 is available for disposing a light source component 102. Exemplarily, each two adjacent device mounting portions 1011 are separated from each other by a convex wall 1012 so as to facilitate positioning of the respective light source component 102. Exemplarily, a top end of the heat sink 101 is open ended, exposing an internal holding cavity 1013 where fin structures 103 extend. A bottom end of the heat sink 101 is connected to a power supply cover 104 and a lamp holder 105.

See also FIG. 2, which is an exploded view of the lighting device 100 in FIG. 1. The lighting device 100 includes a plurality of light source components 102, the heat sink 101, a separator 106, a power supply cover 104, a power supply component 108, and a lamp holder 105. Exemplarily, the plurality of light source components 102 includes a heat dissipation patch 1021, one or more light source devices 1022, and a light-guiding cover 1023.

The heat dissipation patch 1021 is attached to one of the device mounting portions 1011. In some embodiments, the heat dissipation patch 1021 may be made of ceramic, which has good thermal conductivity. The one or more light source devices 1022 are attached to a surface of the heat dissipation patch 1021 facing away from the corresponding device mounting portion 1011. In one example as shown in FIG. 2, there is a plurality of light source devices 1022, which may be arranged in an array. Exemplarily, the light source devices 1022 may be light-emitting devices (LEDs). The light-guiding cover 1023, which is provided outside of the light source devices 1022 and configured to cover the light source devices 1022, is used to adjust light emitted from the light source devices 1022; for example, the light-guiding cover 1023 homogenizes the light emitted from the light source devices 1022. In some embodiments, the light-guiding cover 1023 may be made of glass, or plastic materials such as acrylic, polycarbonate (PC), and polyvinyl chloride (PVC), etc.

The power supply component 108 may be a circuit board carrying a driving circuit of the light source devices 1022. The power supply component 108 may be connected to each of the light source devices 1022 via electrical lines.

Figure 10:
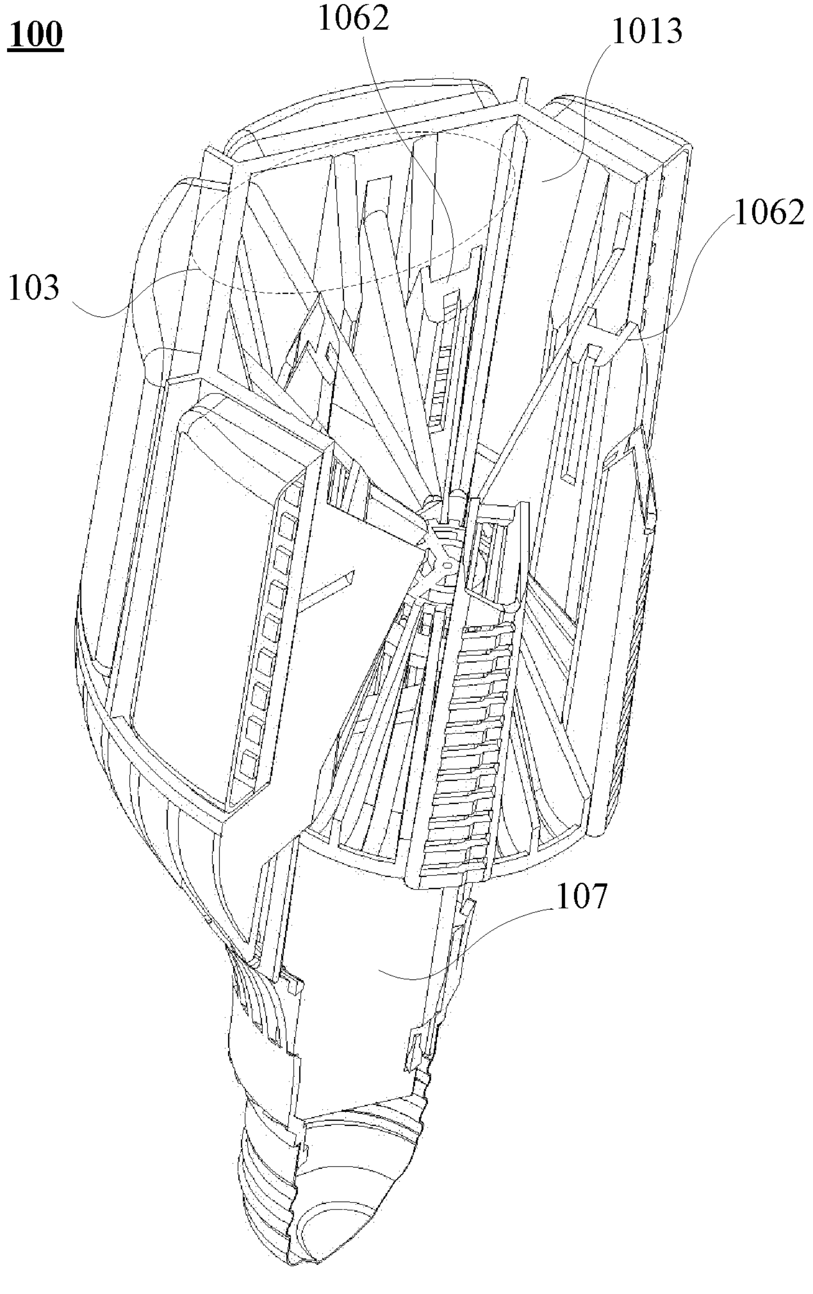
FIG. 10 shows an internal view showing the separator in FIG. 8 being installed in a lighting device.

The separator 106 is to be assembled with the heat sink 101, and the separator 106 and the power supply cover 104 form a power supply cavity 107 between them, as shown in FIG. 10. Specifically, as shown in FIG. 2, one end of the power supply cover 104 (shown as a lower end of the power supply cover 104 in FIG. 2) is snap-fittedly connected to one end of the heat sink 101 (shown as an upper end of the heat sink 101 in FIG. 2). As shown in FIG. 2, in one example, the power supply cover 104 may have a snap-on portion 1041 that extends outwards toward the heat sink 101. The snap-on portion 1041 has a curved shaped so that as it extends toward the heat sink 101, an angle between the snap-on portion 1041 and the axis Z starts as an acute angle and gradually decreases. The snap-on portion 1041 may be flexible and may be snap-fitted to the heat sink 101 by having a protrusion on the snap-on portion 1041 and a depression or a through-hole on the heat sink 101 configured to receive the protrusion.

As shown in FIG. 2, the fin structures 103 of the heat sink 101 also extend toward the separator 106, and the separator 106 can be inserted into the holding cavity of the heat sink 101. Specifically, the separator 106 can be inserted into the holding cavity through a gap among the fin structures 103. Thereby, the separator 106 is located between the power supply cover 104 and the heat sink 101, so that a power supply cavity 107 is formed between the power supply cover 104 and the separator 106 for accommodating the power supply component 108. The other end of the power supply cover 104 is connected to the lamp holder 105. Exemplarily, a surface of the power supply cover 104 is provided with a plurality of ventilation sections 1042, the ventilation sections 1042 may be slots, openings, or through-holes. Specifically, as shown in FIG. 2, the ventilation sections 1042 may be formed by gaps between first strips 1043 on the power supply cover 104, for ventilation and heat dissipation, wherein the first strips 1043 are spaced apart from each other and distributed in a radiating manner around the axis Z. The first strips 1043 and the ventilation sections 1042 may be a multi-layer structure with different radial lengths for different layers, wherein the radial lengths are lengths of the layers measured from the axis Z.

Referring also to FIG. 3, it can be seen that inside the heat sink 101, individual fins in the fin structures 103 extend toward the axis Z, thereby creating a blockage of airflow and reducing a cross-section area of the airflow with the cross-section perpendicular to the axis Z, so that the heat dissipation channel is effectively narrowed, as shown by the narrow gap A in FIG. 3. Exemplarily, in order to cooperate with the fin structures 103, at least a part of the separator 106 takes the shape of a frustum, i.e., the separator has a contour resembling a frustum; the frustum protrudes into the gap among the fin structures 103, thereby enhancing the effect of blocking the airflow.

The fin structures 103 of the heat sink 101 not only block the airflow, but also aid in heat dissipation. The dense fin structures 103 as shown in the figures can increase the heat dissipation area, thus compensating for the loss of heat dissipation efficiency due to the obstruction of the heat dissipation channel, so as to functionally replace the heat dissipation channel.

In addition, FIG. 3 shows the heat dissipation patch 1021, light source devices 1022, light-guiding cover 1023 assembled together, with the heat dissipation patch 1021 being the innermost of the three, and the light-guiding cover 1023 being the outermost of the three.

To see more specific structures of the heat sink 101, reference can be made to FIG. 4, FIG. 5, FIG. 6, and FIG. 7.

Figure 4:
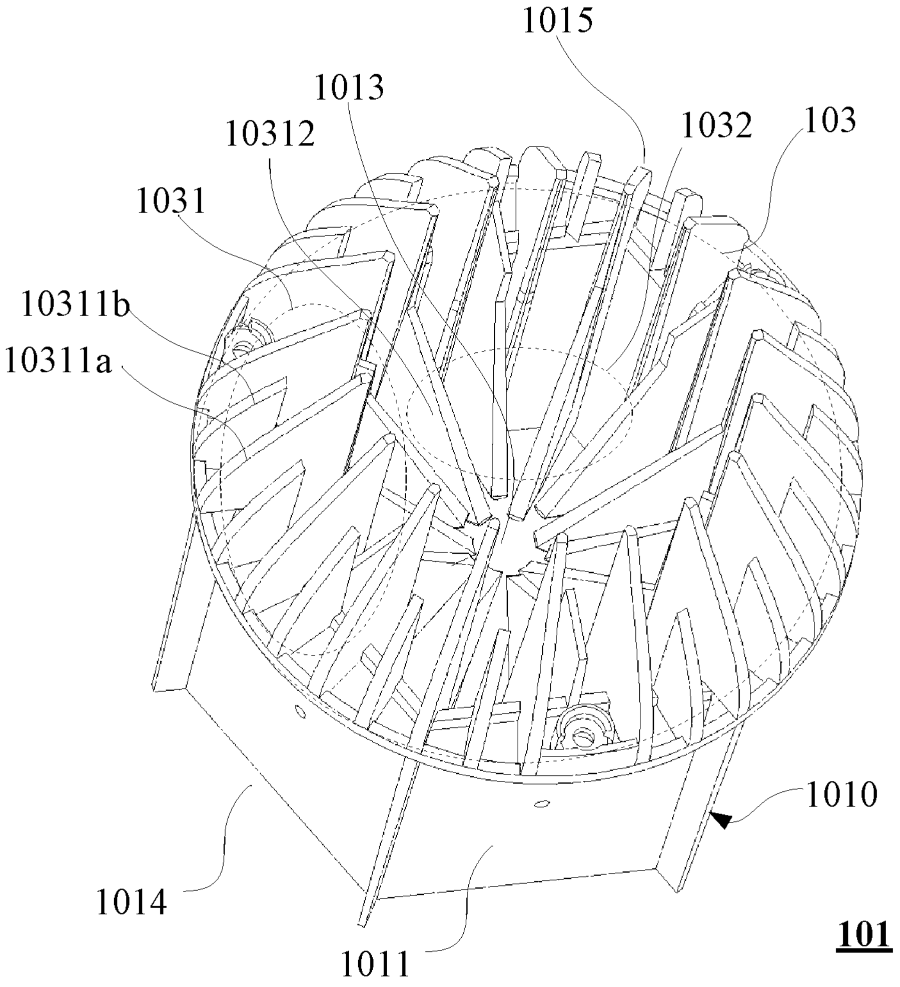
FIG. 4 shows a schematic structural diagram of a heat sink according to an embodiment of the present disclosure.

FIG. 4 shows a schematic structural diagram of a heat sink according to an embodiment of the present disclosure. The heat sink 101 includes a housing 1010 surrounding the axis Z. The housing 1010 is a hollow column in one example, as shown in FIG. 4. The housing 1010 has a first open end 1014 and a second open end 1015 opposite to each other along the axis, and a holding cavity 1013 connecting the first open end 1014 and the second open end 1015. Exemplarily, as shown in FIG. 4, the second open end 1015 is a top end of the housing with fins formed thereon, and the first open end 1014 is a bottom end of the housing.

The housing 1010 includes a first portion and a second portion disposed along the axis, wherein the first portion includes a plurality of device mounting portions 1011 symmetrically disposed around the axis Z for mounting devices, such as the light source components 102 in FIGS. 1 and 2. The second portion includes fin structures 103. The first portion is closer to the first open end 1014 than the second portion is to the first open end 1014; i.e., as shown in FIG. 4, the bottom end of the heat sink 101 is the device mounting portions 1011 of the first portion of the housing 1010, and the top end of the heat sink 101 is the fin structures 103 of the second portion of the housing 1010.

The fin structures 103 include an outer fin set 1031 disposed around the axis Z in an outer peripheral region 1031, and an inner fin set 1032 disposed around the axis Z in an inner peripheral region adjacent to the outer peripheral region. The outer fin set 1031 includes outer fins 10311, and the inner fin set 1032 includes inner fins 10312. For ease of viewing, the outer fin set 1031 illustrated in the figures contains only a portion of the outer fins, and the inner fin set 1032 illustrated in the figures contains only a portion of the inner fins. The outer fin set 1031 extends toward the second open end 1015. Also, the outer fins 10311 and the inner fins 10312 extend toward the axis Z that passes through the holding cavity 1013, and the inner fins 10312 extend deeper into the holding cavity 1013 than the outer fins 10311. In FIG. 4, it can be seen that tips of the outer fins 10311 extend upward while slightly approaching the axis Z, while tips of the inner fins 10312 extends straight towards the axis Z, leaving a smaller gap A at the center as shown in FIG. 3. Exemplarily, the outer fins 10311 and the inner fins 10312 form a plurality of blocks to the airflow in the radial planes (perpendicular to the axis Z) of the holding cavity 1013.

Figure 5:
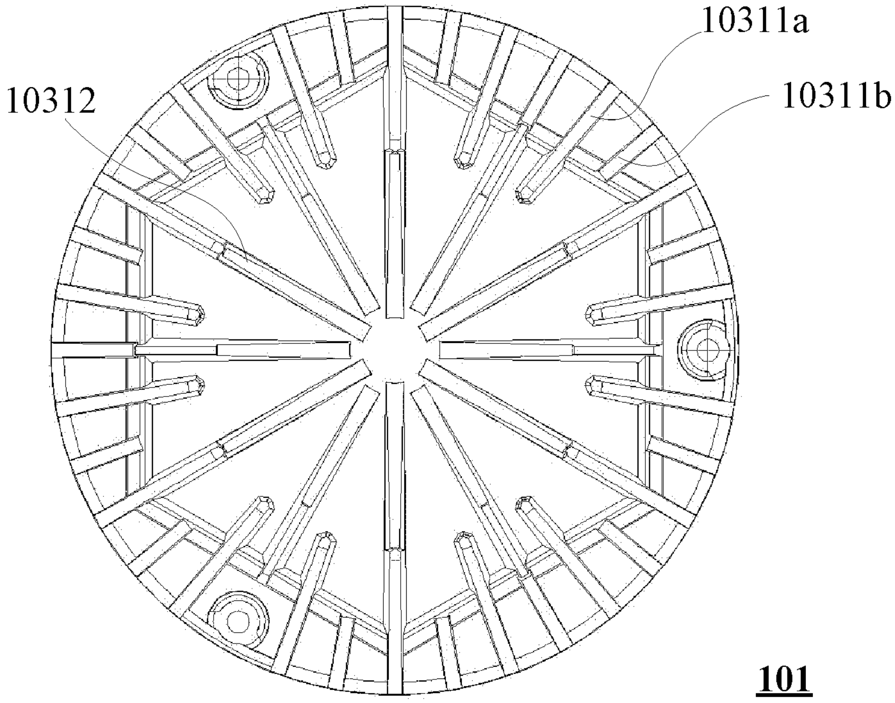
FIG. 5 shows a top view of the heat sink in FIG. 4.
Figure 6:
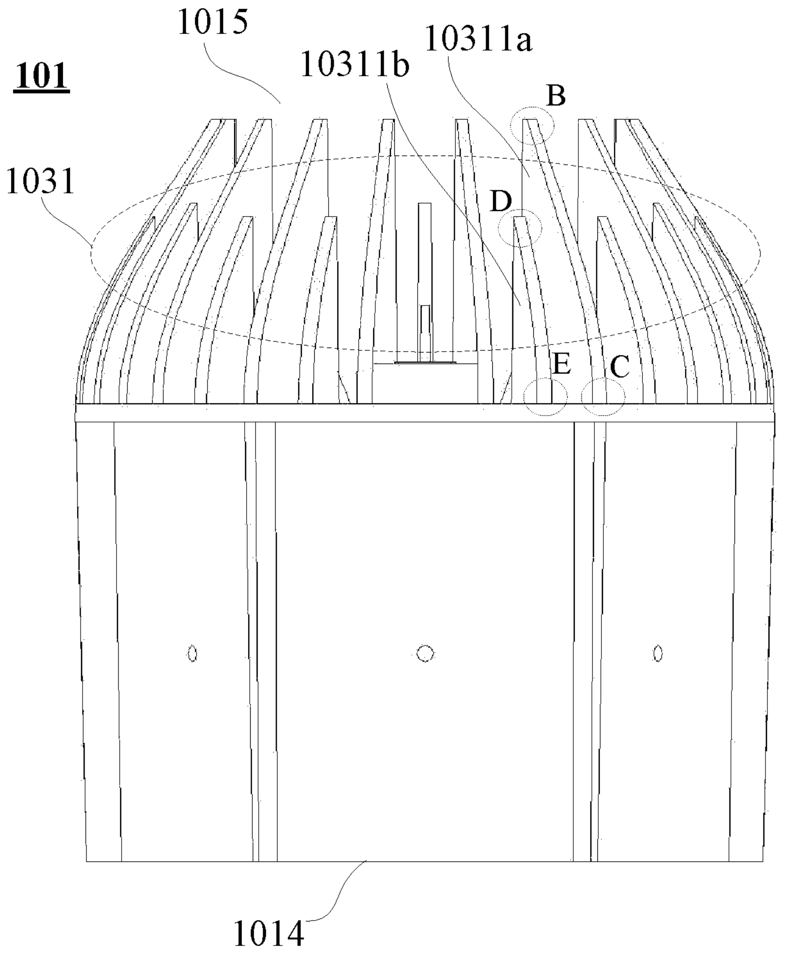
FIG. 6 shows a side view of the heat sink in FIG. 4.

Refer to FIGS. 4, 5 and 6 together. FIG. 5 shows a top view of the heat sink 101 in FIG. 4. FIG. 6 shows a side view of the heat sink 101 in FIG. 4. As shown in FIGS. 4 and 6, the outer fin set 1031 includes first outer fins 10311*a* and second outer fins 10311*b* having different heights, wherein a height of the first outer fins 10311*a* or the second outer fins 10311*b* is a length of the first outer fins 10311*a* or the second outer fins 10311*b* measured from a connection point between the first/second outer fins and the housing 1010 towards the second open end 1015. The difference in height between the first outer fins 10311*a* and the second outer fins 10311*b* allows for more variation in airflow direction than do simple heat dissipation channels based on the "chimney effect". In some embodiments, the fin structures 103 allows the airflow to form a turbulent flow, so that the outer fins 10311*a*, 10311*b* and the inner fins 10312 of the fin structures 103 come into greater contact with the heat-carrying airflow for rapid heat dissipation. In an example as shown in FIG. 6, the first outer fins 10311*a* have a first height, and the second outer fins 10311*b* have a second height, with the first height greater than the second height. Optionally, as shown in FIG. 5, the first outer fins 10311*a* extend towards the axis Z with a first extension length, the second outer fins 10311*b* extend towards the axis Z with a second extension length, and the first extension length is longer than the second extension length. That is, the first outer fins 10311*a* are closer to the axis Z than the second outer fins 10311*b* is to the axis.

Further, the first outer fins 10311*a* and the second outer fins 10311*b* are alternately arranged around the axis, so that different regions of the peripheral of the fin structures around the axis can have substantially the same heat dissipation rate. Preferably, the first outer fins 10311*a* and the second outer fins 10311*b* are evenly and alternately arranged around the axis, and the inner fins 10312 of the inner fin set 1032 are also evenly arranged around the axis.

In some embodiments, thicknesses and heights of the first outer fins 10311*a*, the second outer fins 10311*b*, and the inner fins 10312 are so determined that the heat sink has an optimal heat dissipation performance.

In some embodiments, the height of the first outer fins 10311*a* is between 20 mm and 32 mm, or between 32 mm and 40 mm; in one embodiment, the height of the first outer fins 10311*a* is preferably 32 mm. In some embodiments, the height of the second outer fins 10311*b* is between 10 mm and 20 mm, or between 20 mm and 30 mm; in one embodiment, the height of the second outer fins 10311*b* is preferably 20 mm.

In some embodiments, the first outer fins 10311*a* may have a thickness gradually changing along a direction pointing from its top portion to its bottom portion; or the top portion of each first outer fin 10311*a* simply has a thickness different than that of the bottom portion of the same fin. The top and bottom portions are relatively defined with respect to the height direction. Referring to FIG. 6, the top portion of each first outer fin 10311*a* refers to the end of each first outer fin 10311*a* near the second open end 1015; i.e., the top portion of each first outer fin 10311*a* is a protruded portion, labeled as B in FIG. 6. The bottom portion of each first outer fin 10311*a* refers to the end of each first outer fin 10311*a* near the first open end 1014; i.e., the bottom portion of each first outer fin 10311*a* abuts the first portion of the housing, labeled as C in FIG. 6. In some embodiments, a thickness of the top portion of each first outer fin 10311*a* is between 20 mm and 32 mm, or between 32 mm and 40 mm, and preferably 32 mm. In some embodiments, a thickness of the bottom portion of each first outer fin 10311*a* is between 1 mm and 2.3 mm, or between 2.3 mm and 4 mm, and preferably 2.3 mm.

In some embodiments, the second outer fins 10311*b* may have a thickness gradually changing along a direction pointing from its top portion to its bottom portion; or the top portion of each second outer fin 10311*b* simply has a thickness different than that of the bottom portion of the same fin. Referring to FIG. 6, the top portion of each second outer fin 10311*b* refers to the end of each second outer fin 10311*b* near the second open end 1015, labeled as D in FIG. 6. The bottom portion of each second outer fin 10311*b* refers to the end of each second outer fin 10311*b* near the first open end 1014, labeled as E in FIG. 6. In some embodiments, a thickness of the top portion of each second outer fin 10311*b* is between 0.8 mm and 1.4 mm, or between 1.4 mm and 2 mm, and preferably 1.4 mm. In some embodiments, a thickness of the bottom portion of each second outer fin 10311*b* is between 0.8 mm and 2.3 mm, or between 2.3 mm and 4 mm, and preferably 2.3 mm.

In some embodiments, the first extension length is between 5 mm and 17 mm, or between 17 mm and 25 mm, and preferably 17 mm. In some embodiments, the second extension length is between 5 mm and 8.5 mm, or between 8.5 mm and 25 mm, and preferably 8.5 mm.

In some embodiments, the number of the first outer fins 10311*a* is between 6 and 18, or between 18 and 24, and preferably 18. In some embodiments, the number of the second outer fins 10311*b* is between 6 and 15, or between 15 and 21, and preferably 15.

Figure 7:
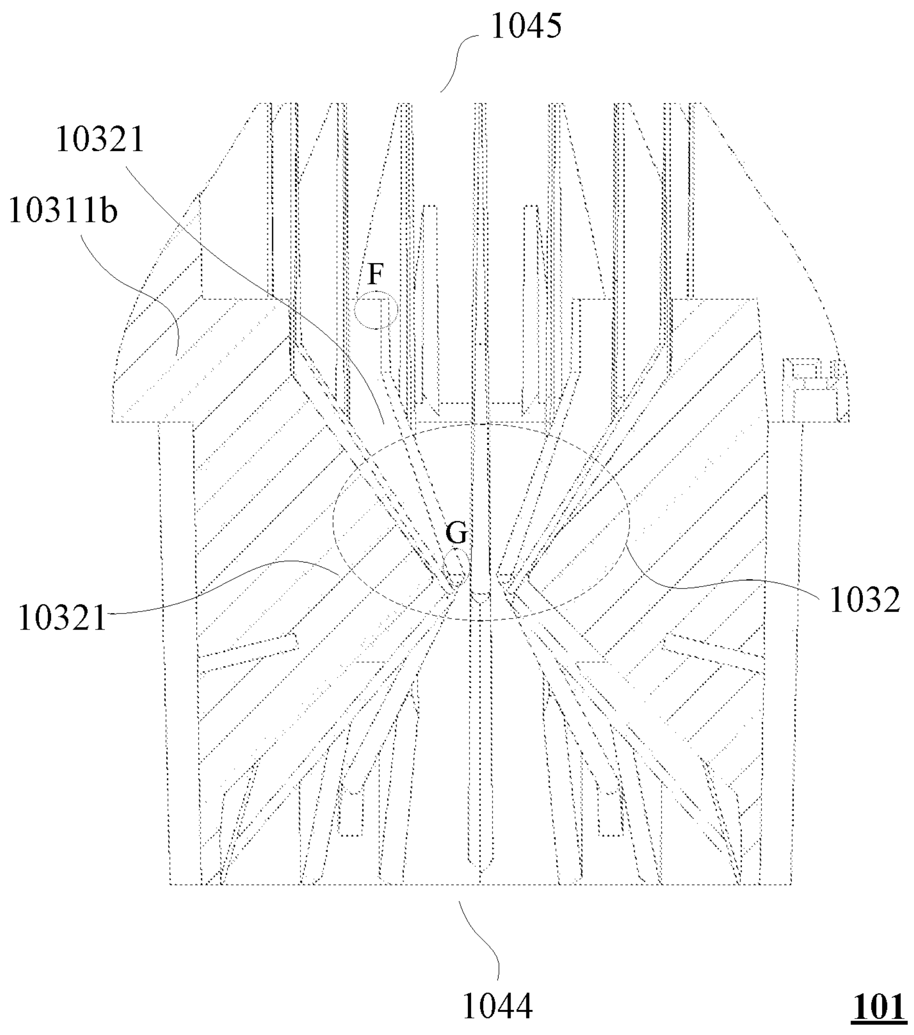
FIG. 7 shows a vertical cross-section of the heat sink in FIG. 4.

In some embodiments, the inner fins 10312 may have a thickness gradually changing along a direction pointing from its top portion to its bottom portion; or the top portion of each inner fin 10312 simply has a thickness different than that of the bottom portion of the same fin. Referring to FIG. 7, the top portion of each inner fin 10312 refers to the end of each inner fin 10312 near the second open end 1015, labeled as F in FIG. 7. The bottom portion of each inner fin 10312 refers to the end of each inner fin 10312 near the first open end 1014, labeled as Gin FIG. 7. In some embodiments, a thickness of the top portion of each inner fin 10312 is between 0.8 mm and 1.4 mm, or between 1.4 mm and 2 mm, and preferably 1.4 mm. In some embodiments, a thickness of the bottom portion of each inner fin 10312 is between 1 mm and 3 mm, or between 3 mm and 4.5 mm, and preferably 3 mm.

In some embodiments, each inner fin 10312 may be attached to one or more outer fins, thereby enhancing the heat dissipation effect. FIG. 7 shows a cross-sectional view of the heat sink 101 in FIG. 6. Each inner fin 10312 in the inner fin set 1032 is connected to one of the second outer fins 10311*b* (i.e., an outer fin with a smaller height). Of course, in other embodiments, each inner fin 10312 may also be attached to one of the first outer fins 10311*a*. Exemplarily, each inner fin 10312 and the corresponding outer fin attached thereto may be a structure obtained by a one-piece molding.

Due to the need for mounting and fixing, slots may be provided at the first open end 1014 of the heat sink 101 for snap-fitting, but the slots will deteriorate the heat dissipation effect of the heat sink 101. Therefore, in some embodiments, bottommost edges of the first portion of the heat sink 101 are on the same plane, wherein the bottommost edges of the first portion are away from the second portion; in other words, the heat sink 101 is flat at the first open end 1014 and has no slots at the first open end 1014.

Figure 8:
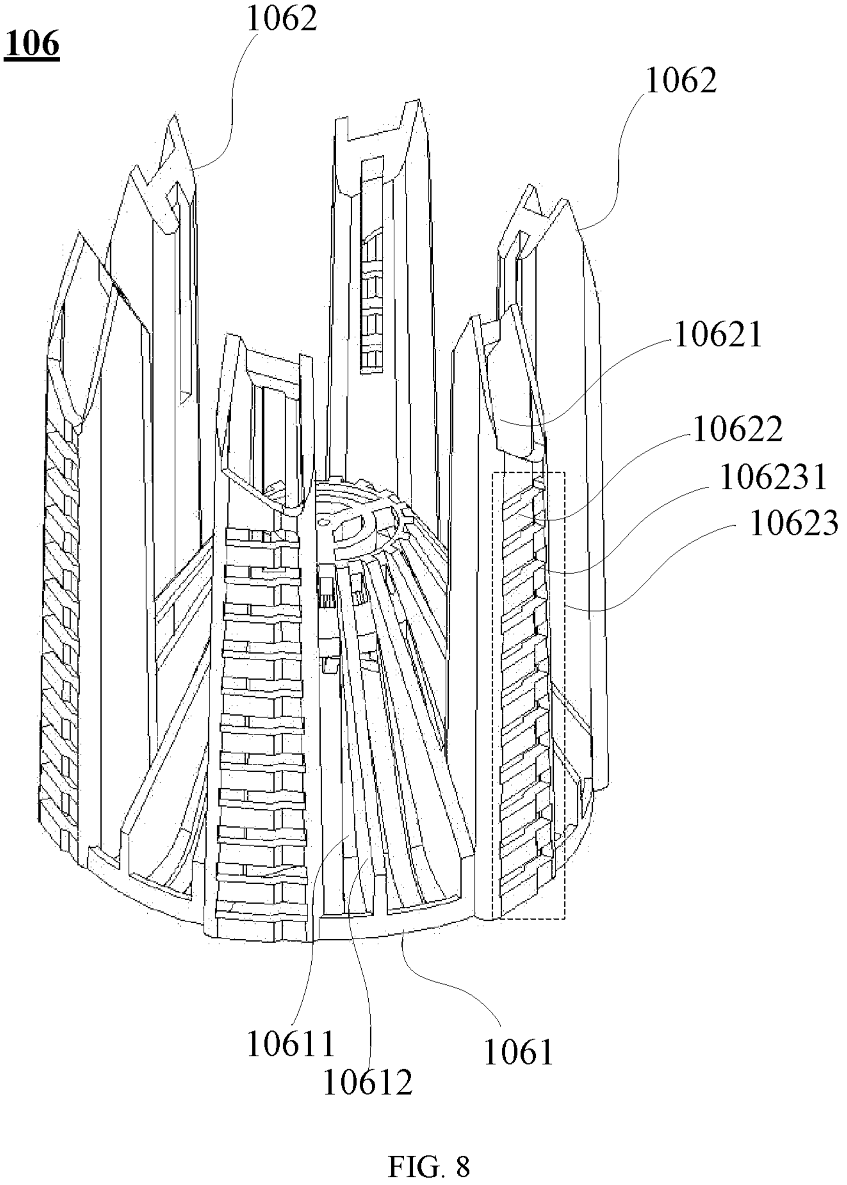
FIG. 8 shows a schematic structural diagram of a separator according to an embodiment of the present disclosure.

FIG. 8 shows a schematic structural diagram of a separator 106 according to an embodiment of the present disclosure. The separator 106 is available for installation into the holding cavity 1013 of the heat sink 101.

As shown in FIG. 8, the separator 106 includes a separating part 1061 and a plurality of wiring pillars 1062.

Figure 9:
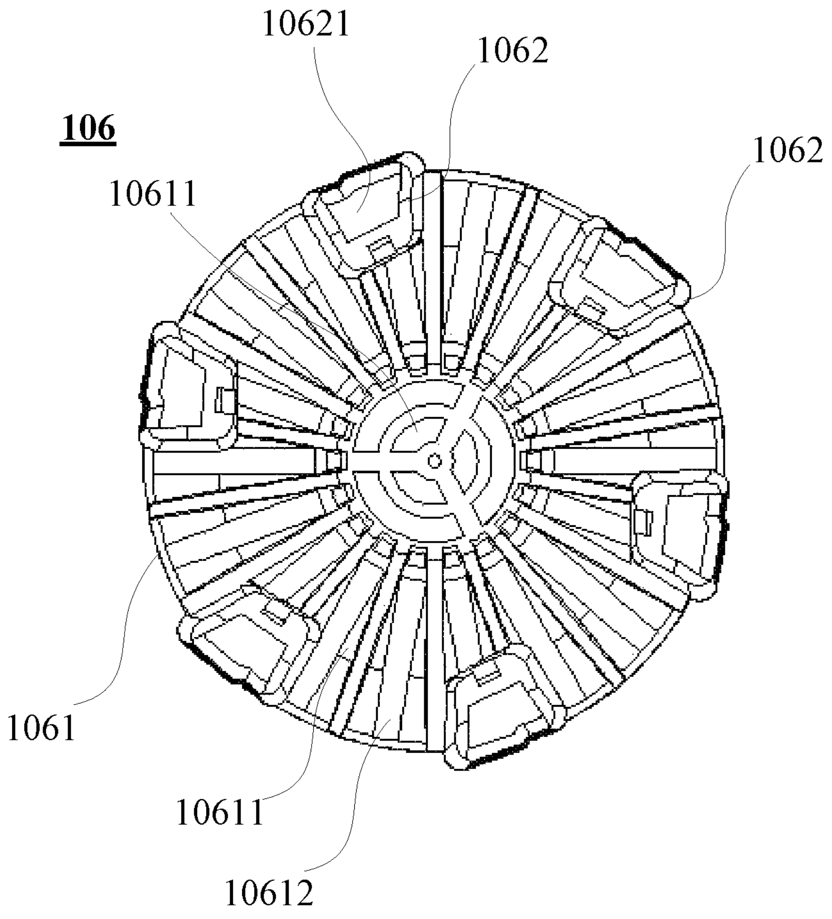
FIG. 9 shows a top view of the separator in FIG. 8.

Referring to FIG. 10 and FIG. 8, the separator 1061 may be placed in the holding cavity 1013 of the heat sink 101 and abut an inner wall of the heat sink 101. The separating part 1061 is in a shape of a frustum, or has a contour in a shape of a frustum; the frustum has a top surface facing towards the second open end, and a bottom surface opposite to the top surface and larger than the top surface, and the top surface of the frustum is surrounded by the inner fins 10312. Exemplarily, the frustum may be a conical frustum or a pyramidal frustum. A surface of the separating part 1061 may be provided with a plurality of hollow sections, such as a plurality of through-holes, slots, or openings on the top surface or a side surface of the frustum. FIG. 9 shows a top view of the separator 106 in FIG. 8. A side surface of the separator 1061 facing towards the second open end 1015 is provided with a plurality of second strips 10612 distributed in a radiating manner around the axis, each of the plurality of second strips 10612 connects the top surface of the frustum to the bottom surface of the frustum, and one or more first hollow sections 10611 are formed between each two adjacent second strips 10612, such as through-holes, slots, or openings. Exemplarily, a plurality of first hollow portions 10611, such as through-holes, slots, or openings, may also be provided at intervals along a circle on the top surface of the frustum.

Referring back to FIG. 8, which shows that the plurality of wiring pillars 1062 is connected to the separating part 1061. In some examples, the plurality of wiring pillars 1062 and the separating part 1061 may be a structure obtained by one-piece molding. In some examples, each of the plurality of wiring pillars 1062 is formed between two adjacent inner fins 10312, or between a first outer fin 10311*a* and a second outer fin 10311*b* that are adjacent to each other. Each of the plurality of wiring pillars 1062 includes a wiring cavity 10621, wherein the wiring cavity 10621 has two distal openings at two ends of the corresponding wiring pillar 1062. The wiring cavities 10621 are available for threading electrical connection lines between the power supply component 108 and the light source devices 1022.

Exemplarily, one or more second hollow sections 10622 may be provided on a side surface of each of the wiring pillars 1062. FIG. 8 shows a grating structure 10623 is formed on an outward-facing portion of the side surface of each of the wiring pillars 1062, wherein the grating structure 10623 includes a plurality of third strips 106231, and the second hollow sections 10622 between the third strips 106231.

Referring to both FIG. 8 and FIG. 10. FIG. 10 is a schematic internal view showing the separator being installed in the lighting device 100. As shown, the separator 106 can be inserted into the holding cavity 1013 from the second open end of the heat sink, and each of the wiring pillars 1062 extends into the gap among the fin structures 103, a first end of each of the plurality of wiring pillars 1062 is connected to the separating part 1061, and the corresponding opening at the first end is communicated with the power supply cavity 107. A second end of each of the plurality of wiring pillars 1062 extends towards the second open end and has a pointed cone shape, which enhances heat dissipation.

Note that the separating part 1061 is in a shape of a frustum, and the wiring pillars 1062 have pointed tips; these features all contribute to a non-flat structure that disrupts airflow, and facilitates the formation of turbulent flow, thereby enhancing the heat dissipation effect of the fin structures 103.

In particular, it should be noted that, although the above embodiments show the lighting device 100 as a light bulb, it may also a lighting device of any other type, or a pixel light source module in a larger lighting device (for example, when the light source component 102, heat sink 101, etc., are integrated into a tiny package). Also, although the heat sink 101 in FIG. 2, and FIG. 4 to FIG. 7 is shown in the same structure and the separator 106 in FIG. 2, and FIG. 8 to FIG. 10 is shown in the same structure, it should be understood that the heat sink 101 can also be used for heat dissipation of electronic components in other devices, not limited to light bulbs. Similarly, the separator 106 also be used in combination with the heat sink 101 in corresponding scenarios.

As shown in the above embodiments, the use of the heat sink 101, separator 106, etc. in the lighting device 100 to replace the vertical heat dissipation channels in conventional lamps avoids the problem that the heat dissipation effect of the heat dissipation channels is limited by how the lamp is orientated when used, realizing the use of the lighting device 100 in a free angle.

Figure 11:
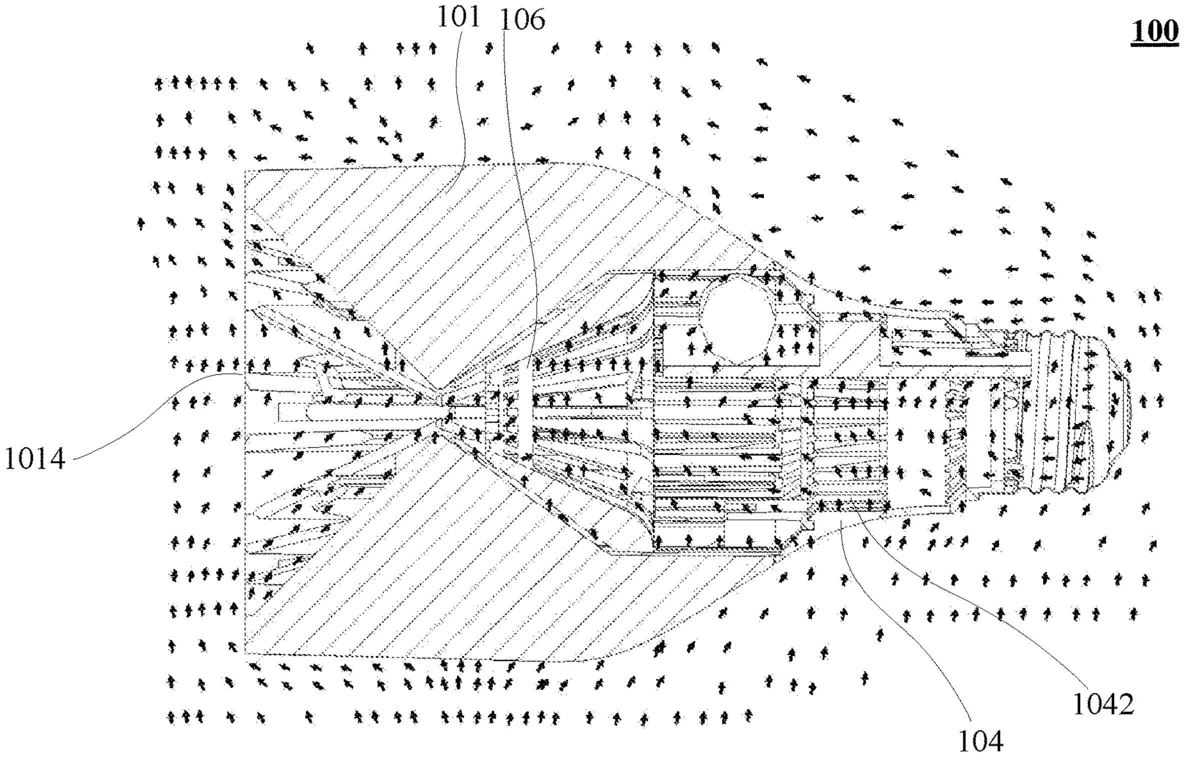
FIG. 11 is an airflow map of a lighting device when the lighting device is placed horizontally according to an embodiment of the present disclosure.

As an example, FIG. 11 is an airflow map of the lighting device 100 when the lighting device is placed horizontally according to an embodiment of the present disclosure.

As can be seen from FIG. 11, the airflow entering the heat sink 101 flows over surfaces of the fin structures 103, and due to the thorny surfaces of the fin structures 103 leading to a larger heat dissipation area, good heat dissipation can be achieved without relying on heat dissipation channels. It can be seen that, when the lighting device 100 is placed horizontally, as shown in FIG. 11, there is little airflow flowing from the ventilation sections 1042 to the power supply cavity 107, the separator 106, and the heat sink 101, and then out of the first open end 1014, so that the lighting device 100 does not depend on the heat dissipation channels along the axis for heat dissipation, and thus can be placed horizontally, obliquely, or vertically, making it applicable in a wider range of scenarios.

In summary, a heat sink, a separator, and a lighting device applying the same are provided. The heat sink includes: a housing, symmetrical with respect to an axis, wherein the housing has a first open end and a second open end along the axis, and a holding cavity connecting the first open end and the second open end. The housing includes a first portion and a second portion, both symmetrically disposed around the axis, wherein the first portion includes a plurality of device mounting portions symmetrically disposed around the axis. the second portion includes fin structures, wherein the fin structures include an outer fin set disposed around the axis in an outer peripheral region, and an inner fin set disposed around the axis in an inner peripheral region; the first portion is closer to the first open end than the second portion is to the first open end, and the outer fin set extends toward the second open end; Each fin extends toward the axis that passes through the holding cavity, so as to partially block airflow parallel to the axis. Thus, by combining the inner and outer fins to replace vertical heat dissipation channels used in conventional lamps, the lighting device of the present disclosure can have good heat dissipation no matter how it is orientated.

The above-mentioned embodiments are merely illustrative of the principle and effects of the present disclosure instead of limiting the present disclosure. Those skilled in the art can make modifications or changes to the above-mentioned embodiments without going against the spirit and the range of the present disclosure. Therefore, all equivalent modifications or changes made by those who have common knowledge in the art without departing from the spirit and technical concept disclosed by the present disclosure shall be still covered by the claims of the present disclosure.

What is claimed is:

1. A heat sink, comprising:

a housing, symmetrical with respect to an axis, wherein the housing has a first open end and a second open end along the axis, and a holding cavity connecting the first open end and the second open end;

wherein the housing comprises a first portion and a second portion, both symmetrically formed around the axis, wherein the first portion comprises a plurality of device mounting portions symmetrically disposed around the axis; wherein the second portion comprises fin structures; wherein the fin structures comprise an outer fin set disposed around the axis in an outer peripheral region, and an inner fin set disposed around the axis in an inner peripheral region inside the outer peripheral region; wherein the first portion is closer to the first open end than the second portion is to the first open end, and the outer fin set extends toward the second open end; wherein outer fins of the outer fin set and inner fins of the inner fin set extend toward the axis that passes through the holding cavity, and the inner fins extend deeper into the holding cavity than the outer fins, so as to partially block airflow parallel to the axis.

2. The heat sink according to claim 1, wherein the outer fin set comprises one or more first outer fins and one or more second outer fins, and the first outer fins and the second outer fins have different heights, wherein a height of the first outer fins or the second outer fins is a length of the first outer fins or the second outer fins measured from a connection point between the first outer fins or the second outer fins and the housing towards the second open end.

3. The heat sink according to claim 2, wherein the outer fin set comprises a plurality of first outer fins having a first height, and a plurality of second outer fins having a second height, with the first height being greater than the second height.

4. The heat sink according to claim 3, wherein the one or more first outer fins and the one or more second outer fins are alternately disposed around the axis.

5. The heat sink according to claim 3, wherein the first height is between 20 mm and 32 mm, or between 32 mm and 40 mm; and/or, the second height is between 10 mm and 20 mm, or between 20 mm and 30 mm.

6. The heat sink according to claim 3, wherein a thickness of a top portion of each of the plurality of first outer fins is between 20 mm and 32 mm, or between 32 mm and 40 mm, and a thickness of a bottom portion of each of the plurality of first outer fins is between 1 mm and 2.3 mm, or between 2.3 mm and 4 mm; and/or, a thickness of a top portion of each of the plurality of second outer fins is between 0.8 mm and 1.4 mm, or between 1.4 mm and 2 mm, and a thickness of a bottom portion of each of the plurality of second outer fins is between 0.8 mm and 2.3 mm, or between 2.3 mm and 4 mm; wherein the top portions refer to portions of the plurality of first outer fins and the plurality of second outer fins closer to the second open end, and the bottom portions refer to portions of the plurality of first outer fins and the plurality of second outer fins closer to the first open end.

7. The heat sink according to claim 3, wherein the plurality of first outer fins extends towards the axis with a first extension length of 5 mm to 17 mm, or 17 mm to 25 mm; and/or, the plurality of second outer fins extends towards the axis with a second extension length of 5 mm to 8.5 mm, or 8.5 mm to 25 mm.

8. The heat sink according to claim 3, wherein the plurality of first outer fins comprises 6 to 18 fins, or 18 to 24 fins; and/or, the plurality of second outer fins comprises 6 to 15 fins, or 15 to 21 fins.

9. The heat sink according to claim 1, wherein a thickness of top portions of each of the inner fins is between 0.8 mm and 1.4 mm, or between 1.4 mm and 2 mm, and a thickness of bottom portions of each of the inner fins is between 1 mm and 3 mm, or between 3 mm and 4.5 mm.

10. The heat sink according to claim 1, wherein each fin of the outer fin set and/or the inner fin set has a thickness gradually changing along a direction pointing from its top portion to its bottom portion, or, the top portion of each fin of the outer fins and/or the inner fins has a thickness different than that of the bottom portion of the same fin.

11. The heat sink according to claim 1, wherein each inner fin of the inner fin set is connected to one or more outer fins of the outer fin set.

12. The heat sink according to claim 11, wherein the outer fin set comprises a plurality of first outer fins having a first height, and a plurality of second outer fins having a second height, with the first height being greater than the second height; and the inner fin set is connected to the plurality of second outer fins.

13. The heat sink according to claim 1, wherein fins of the outer fin set are evenly distributed around the axis and/or, fins of the inner fin set are evenly distributed around the axis.

14. The heat sink according to claim 1, wherein the inner fin set extends into the housing with a third extension length of 5 mm to 16 mm, or 16 mm to 20 mm.

15. The heat sink according to claim 1, wherein the inner fin set comprises 6 to 12 fins, or 12 to 24 fins.

16. The heat sink according to claim 1, wherein the heat sink is flat at the first open end with no notches.

17. A separator, used in the holding cavity of the heat sink as in claim 1, wherein the separator comprises:

a separating part, placed in the holding cavity and abutting an inner wall of the heat sink; wherein the separating part has a contour in a shape of a frustum, the frustum has a top surface facing towards the second open end, and a bottom surface opposite to the top surface and larger than the top surface, and the top surface of the frustum is surrounded by the inner fin set, wherein a plurality of first hollow sections is provided on a side surface of the separating part, and the side surface of the separating part is between the top surface and bottom surface of the frustum; and a plurality of wiring pillars formed upon the separating part; each of the plurality of wiring pillars is formed between two adjacent fins of the inner fin set; each of the plurality of wiring pillars comprises a wiring cavity, wherein the wiring cavity has two distal openings at two ends of the corresponding wiring pillar; a first end of each of the plurality of wiring pillars is connected to the separating part, the corresponding opening at the first end is communicated with a power supply cavity, and a second end of each of the plurality of wiring pillars extends towards the second open end and has a pointed cone shape.

18. The separator according to claim 17, wherein a plurality of strips is formed on the side surface of the separating part and distributed in a radiating manner around the axis, each of the plurality of strips connects the top surface of the frustum to the bottom surface of the frustum, and at least one of the plurality of first hollow sections is formed between each two adjacent strips of the plurality of strips; and/or, at least one second hollow section is provided on a side surface of each of the plurality of wiring pillars.

19. A lighting device, comprising:

a plurality of light source components;

the heat sink as claimed in claim 1, wherein each of the device mounting portions is provided with one or more of the plurality of light source components;

a separator assembled with the heat sink;

a power supply cover, which has a first end snap-fittedly connected to the second portion of the housing of the heat sink, wherein a power supply cavity is formed between the power supply cover and the separator, for accommodating a power supply component; wherein the power supply cover has a second end connected to a lamp holder; a plurality of ventilation sections are formed on a surface of the power supply cover;

wherein the separator comprises:

a separating part, placed in the holding cavity and abutting an inner wall of the heat sink; wherein the separating part has a contour in a shape of a frustum, the frustum has a top surface facing towards the second open end, and a bottom surface opposite to the top surface and larger than the top surface, and the top surface of the frustum is surrounded by the inner fin set, wherein a plurality of first hollow sections is provided on a side surface of the separating part, and the side surface of the separating part is between the top surface and bottom surface of the frustum; and a plurality of wiring pillars formed upon the separating part; each of the plurality of wiring pillars is formed between two adjacent fins of the inner fin set; each of the plurality of wiring pillars comprises a wiring cavity, wherein the wiring cavity has two distal openings at two ends of the corresponding wiring pillar; a first end of each of the plurality of wiring pillars is connected to the separating part, the corresponding opening at the first end is communicated with the power supply cavity, and a second end of each of the plurality of wiring pillars extends towards the second open end and has a pointed cone shape.

20. The lighting device according to claim 19, wherein each of the plurality of light source components comprises:

a heat dissipation patch, attached to one of the device mounting portions;

one or more light source devices, attached to a surface of the heat dissipation patch facing away from the corresponding device mounting portion; and a light-guiding cover, configured to cover the one or more light source devices.

* * * * *